(12) United States Patent  (10) Patent No.: US 8,220,512 B2
Ferlin  (45) Date of Patent: Jul. 17, 2012

(54) TIRE BEAD

(75) Inventor: Olivier Ferlin, Malauzat (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 675 days.

(21) Appl. No.: 11/659,248

(22) PCT Filed: Aug. 2, 2005

(86) PCT No.: PCT/EP2005/053750
§ 371 (c)(1),
(2), (4) Date: Feb. 2, 2007

(87) PCT Pub. No.: WO2006/013201
PCT Pub. Date: Feb. 9, 2006

(65) Prior Publication Data
US 2009/0025848 A1  Jan. 29, 2009

(30) Foreign Application Priority Data
Aug. 2, 2004  (FR) .................................... 04 08555

(51) Int. Cl.
*B60C 15/00* (2006.01)
*B60C 15/06* (2006.01)
(52) U.S. Cl. ........ 152/539; 152/542; 152/552; 152/554; 152/555

(58) Field of Classification Search .................. None
See application file for complete search history.

(56) References Cited

U.S. PATENT DOCUMENTS 5,261,979 A * 11/1993 Caretta ....................... 156/130.7
6,273,162 B1 * 8/2001 Ohara et al. .................. 152/540
6,491,079 B2 * 12/2002 Kato et al. ..................... 152/543

FOREIGN PATENT DOCUMENTS

| DE | 3603838 | * | 8/1987 |
| JP | 11 321244 A | | 11/1999 |
| JP | 2000 219016 A | | 8/2000 |

* cited by examiner

*Primary Examiner* — Justin Fischer
(74) *Attorney, Agent, or Firm* — Cozen O'Connor

(57) ABSTRACT

A tire with two beads (11) and a radial carcass reinforcement (12) anchored in each bead by an upturn (15) which forms at least one loop around a circumferential bead reinforcement (13), said upturn—when viewed in meridian section—beginning at a point of origin (A1) that corresponds to the point of intersection between the carcass reinforcement and a line (D) perpendicular to the tire's rotation axis and passing through the radially innermost point (A) of the circumferential bead reinforcement (13). A feature of the tire is that when viewed in meridian section, the end (F) of the upturn (15) is located between said upturn (15) of the carcass reinforcement and the circumferential bead reinforcement (13).

14 Claims, 4 Drawing Sheets

TIRE BEAD

RELATED APPLICATION

This is a U.S. National Phase Application under 35 USC 371 of International Application PCT/EP2005/053750, filed on Aug. 2, 2005.

FIELD OF INVENTION

The present invention concerns a tire with radial carcass reinforcement and more particularly a tire intended for fitting on heavy vehicles carrying heavy loads, in particular trucks, buses or trailers, and in which a new bead reinforcement structure is designed to improve the endurance of the tire.

BACKGROUND OF INVENTION

As is known, a tire of the type considered has beads designed to co-operate with the seats of a mounting rim, the beads being connected to a tire crown by sidewalls. The tire comprises a carcass reinforcement formed of at least a plurality of metallic or non-metallic cords orientated in a meridian direction, i.e. a direction that makes an angle equal or close to 90° with the circumferential direction. This carcass reinforcement is anchored in each bead to at least one circumferential bead reinforcement (for example a bead wire), forming an upturn. The carcass reinforcement is surmounted radially by a crown reinforcement consisting of at least two stacks of metallic reinforcement elements crossed over from one stack to the next, which form angles between 10° and 45° with the circumferential direction. In addition, the upturns of the carcass reinforcement are usually reinforced by at least one supplementary reinforcement whose reinforcing elements, whether metallic or not, are arranged so as to make an angle smaller than 45° with the circumferential direction.

Under certain types of stressing the tire beads are subjected to conditions of relatively high temperature compared with the average working temperatures. These temperature increases arise mainly because of heating of the brake components of heavy vehicles and the radiation that results from this.

To increase the endurance of the tire beads it is known to provide said beads with supplementary reinforcements arranged in the beads so that they are interposed between the seat of said beads and the circumferential reinforcement anchoring the carcass reinforcement. However, this solution causes high stresses to appear at the radially outer end of said supplementary reinforcements, and these stresses can adversely affect the endurance of the tire.

In another solution (described in particular in patent publication FR 1328752) a bead is described which comprises a bead wire around which is wrapped the carcass reinforcement and its upturn. Although this solution effectively improves the endurance of the bead, it is nonetheless not totally satisfactory, in particular because it entails positioning a wrapping of cords on the radially outer portion of the bead wire and upturn so as to hold said upturn firmly onto the bead wire.

Granted that the useful life of tires is increasing (in particular when judged using the criterion of tread wear), it has been found that high temperatures repeatedly applied to the tire lead to permanent deformations of the beads which reduce the endurance of said beads.

The aim of the present invention is to obtain a tire bead structure for vehicles carrying heavy loads, this structure conferring upon said bead an endurance appropriate in relation to the user's needs while reducing the number of components.

SUMMARY OF THE INVENTION

To that end, a tire according to an embodiment of the invention comprises two beads designed to co-operate with the seats of a mounting rim. The tire comprises a radial carcass reinforcement anchored in each bead by an upturn that forms at least one complete loop around a circumferential bead reinforcement, this upturn—when viewed in meridian section, i.e. in a plane containing the rotation axis of the tire—beginning at a point of origin that corresponds to the point of intersection between the carcass reinforcement and a line perpendicular to the tire's rotation axis and passing through the radially innermost point of the circumferential bead reinforcement. A feature of the tire being is that when viewed in meridian section, the end of the upturn is located between said carcass reinforcement upturn and the circumferential bead reinforcement.

Thanks to this structure in the form of a complete loop (i.e. whose upturn passes at least twice through or close to said upturn's point of origin), the anchoring of the carcass reinforcement is improved and the effect of this is to enable better mechanical endurance of the bead when subjected to repeated heating; in effect, the position chosen for the end of the upturn clamps the end of the carcass reinforcement between the bead reinforcement and the seat of the rim used when the tire is mounted on said rim.

In a known way, the bead reinforcement includes at least one bead wire (i.e. at least one wire or cord or assembly of wires or cords forming a circumferentially continuous structure and having appropriate tensile rigidity) whose meridian section can be, in particular but not exclusively, circular or even rectangular.

In most cases tires for heavy vehicles or tires for machines carrying very heavy loads have a carcass reinforcement that comprises a plurality of metallic reinforcing elements (in the form of wires or cords). Depending on the size of the tire concerned, these metallic reinforcing elements have properties which sometimes make it difficult to curve them tightly enough when it is desired to form a loop with the carcass upturn. In such cases it is proposed to lengthen the carcass reinforcement with an extension forming an upturn in the shape of an anchoring loop according to the invention, with one end of said extension located between the carcass reinforcement upturn and the circumferential bead reinforcement. Note that the starting point of the upturn, viewed in a meridian section plane containing the rotation axis, corresponds to the point of intersection between the carcass reinforcement and a line perpendicular to the rotation axis of the tire, this line passing through the radially innermost point of the circumferential bead reinforcement. Besides, the other end of the upturn corresponds to the end point of the extension which is linearly furthest away from the starting point of the upturn.

In a known way, a cladding, for example of a rubber mix, can be provided around the circumferential bead reinforcement, such as a bead wire, to prevent direct contact between the carcass reinforcement and said bead wire.

To compensate for the absence of an upturn that extends into the bead and co-operates with the carcass reinforcement radially beyond the bead wire in the manner of a usual bead structure, it is advantageous for the outermost point of the loop formed by the upturn to be located a distance away from the rotation axis which is larger than the radius of the radially outermost points of the rim (in practice, a rim comprises seats extended axially outwards by flanges or hooks designed to limit the axial displacement of the rims when the tire is mounted on the rim and inflated).

Thus, the loop around the bead wire and its cladding forms a radially outer portion of a size appropriate for creating a support for the carcass reinforcement during the cyclic bending movements at each revolution of the wheel, so avoiding localized bending in particular around the rim hook.

BRIEF DESCRIPTION OF THE DRAWINGS

Other characteristics and advantages of the invention emerge from the description given below with reference to the attached drawings which show, as non-limiting examples, various embodiments of the object of the invention.

DESCRIPTION OF THE PREFERRED EMBODIMENTS

Figure 1:
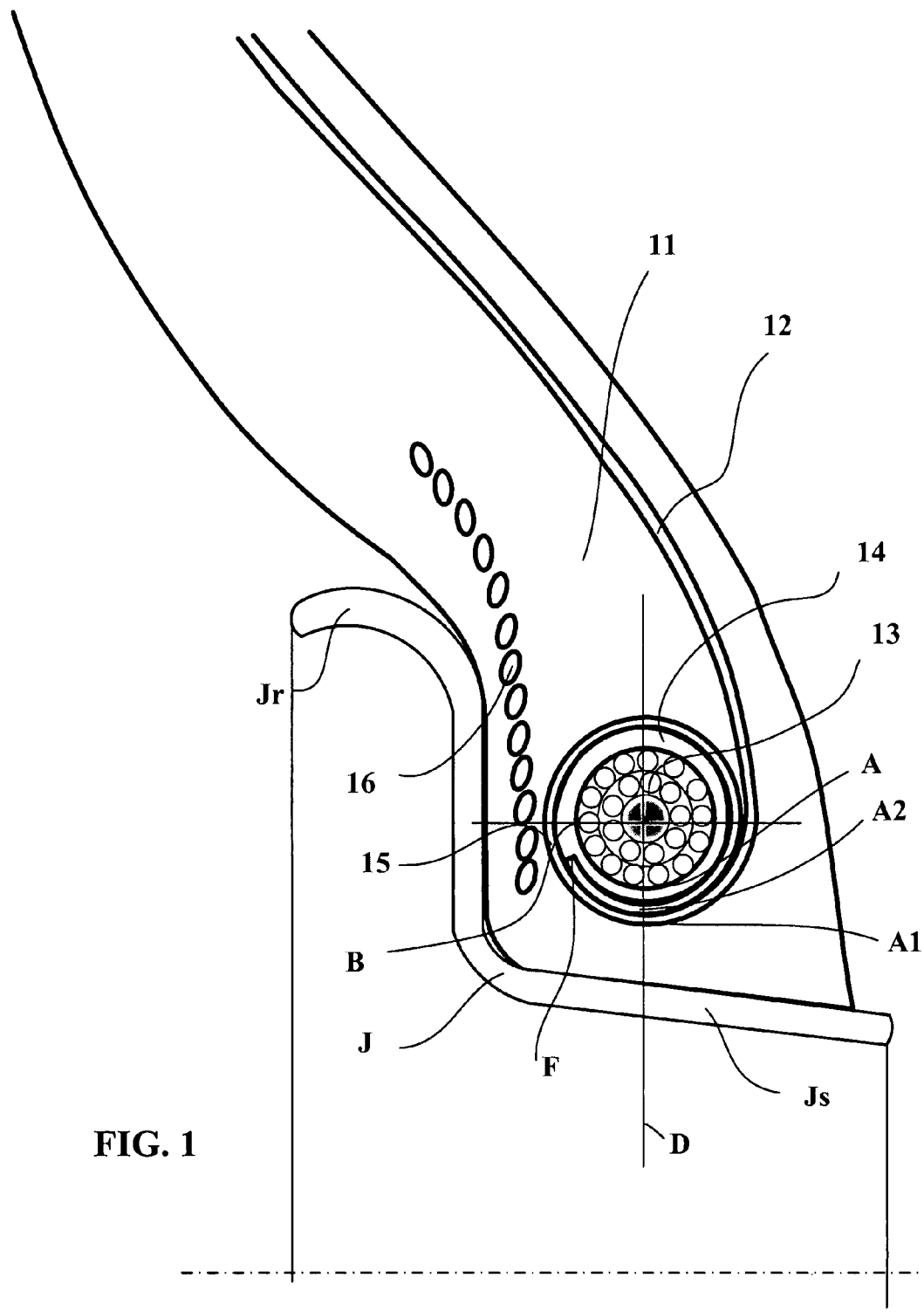
FIG. 1 shows a section through a tire bead whose circumferential bead reinforcement is a bead wire of circular section.

FIG. 1 shows a section in a meridian plane (i.e. a plane containing the tire's rotation axis) of a tire bead 11 according to the invention. This tire bead, intended for mounting on a rim J having slightly inclined seats Js (angle with the rotation axis smaller than or equal to 10°) extended axially outwards by flanges Jr, comprises a carcass reinforcement 12 anchored around a circumferential bead reinforcement consisting of a bead wire 13 of essentially circular section. The anchoring bead wire 13 is formed of a plurality of cords wrapped helically around a core cord; the bead wire 13 is clad with a profiled element 14 made of a rubber mix that ensures a mechanical bond to the carcass reinforcement 12.

The carcass reinforcement 12 consists of a rubber mix reinforced by a plurality of metallic cords orientated in an essentially radial direction (i.e. forming an angle close or equal to 90° with the circumferential direction).

In the meridian plane of FIG. 1, the beginning of the upturn 15 of the carcass reinforcement 12 is defined by a point A1 obtained as the intersection between the carcass reinforcement 12 and a line D perpendicular to the tire's rotation axis and passing through a radially innermost point A of the bead wire 13. The letter F marks the other end of the upturn 15 of the carcass reinforcement.

In the bead 11 shown, the upturn is wrapped around the bead wire to form a complete loop, i.e. a loop which, besides the point A1 where the upturn begins, again cuts the line D at a point A2 and ends at the end point F located axially outside the line D ("axially outside" being understood to mean outside the cavity delimited by the tire). The end portion of the upturn (the portion between the points A2 and F) is thus clamped between the upturn itself and the bead wire, which results in improved anchoring of the carcass reinforcement 12 by clamping between the radially innermost point of the bead wire 13 and the rim seat Js.

Preferably, for heavy vehicle tires of this type the upturn 15 is located at least between the point A and a point B corresponding to the axially outermost point of the bead wire. In this way the contact pressures against the rim flange Jr serve to improve the anchoring of the carcass reinforcement.

As can be seen, the bead 11 also comprises a supplementary reinforcement 16 formed of a plurality of reinforcing elements inclined relative to the circumferential direction by an angle smaller than 90°; in the case illustrated, this supplementary reinforcement 16 has a radially inner end located radially on the inside relative to the point B. To increase still further the gripping effect of the loop formed by the upturn, this supplementary bead reinforcement 16 can be extended radially under the bead wire 13.

The same structure can advantageously be used in the case of a carcass reinforcement whose reinforcing elements are of the textile type.

Figure 2:
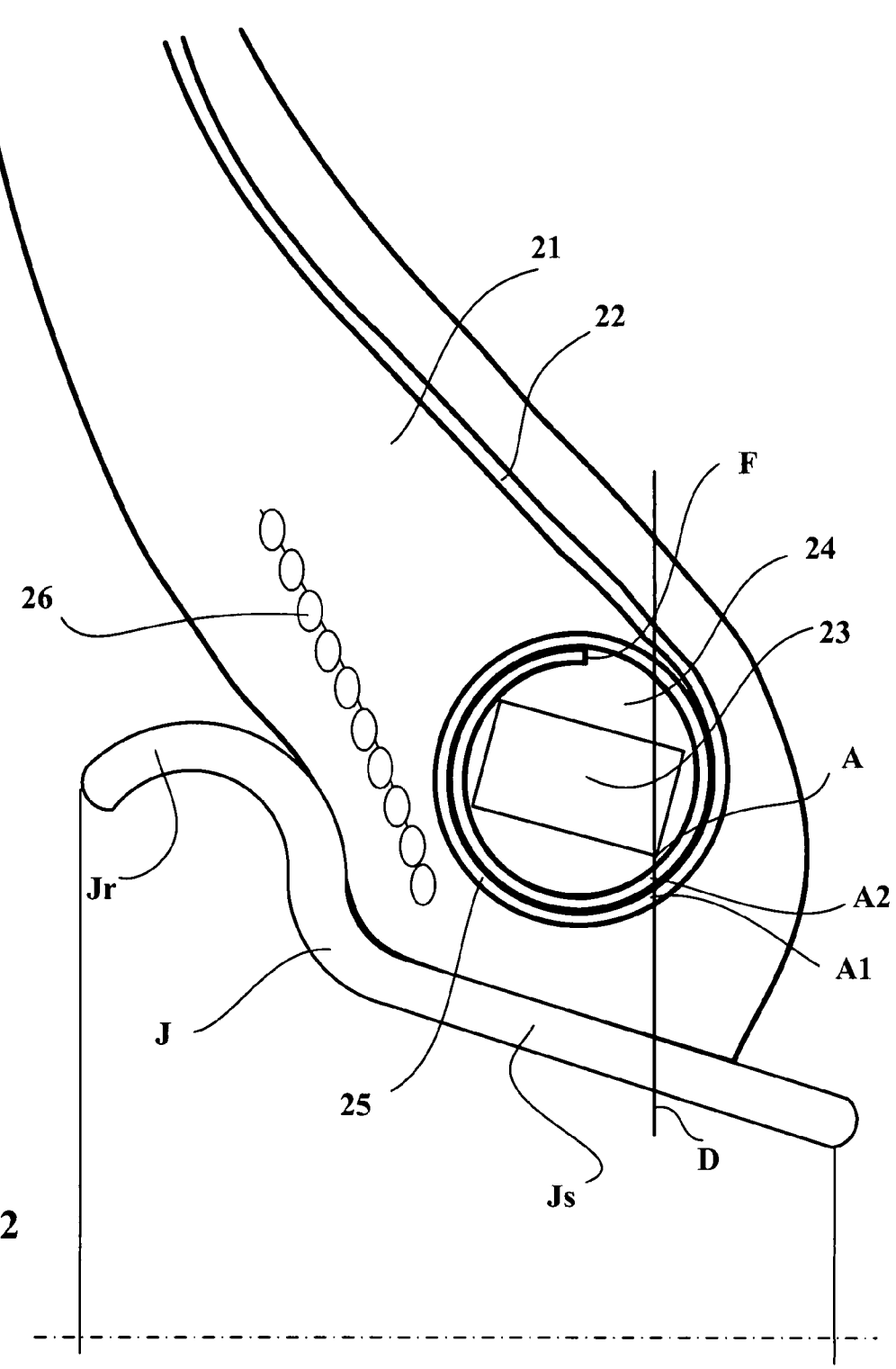
FIG. 2 shows a section through a tire with a bead wire of essentially rectangular cross-section, clad in a profiled element whose outer shape is essentially circular.

FIG. 2 shows a meridian section of a tire bead 21 designed to be mounted on a rim J whose seats Js are inclined by an angle essentially equal to 15°, these seats being extended axially outwards by hooks Jc.

In this example of a tire according to the invention, a carcass reinforcement 22 comprising a plurality of reinforcing elements in the form of metallic cords is anchored in each bead to a bead wire 23 of essentially quadrilateral section, two of the sides of this bead wire section having an inclination close or equal to the inclination of the rim seats Js. The bead wire 23 is clad in a profiled element 24 which, seen in the plane of FIG. 2, has an essentially circular outer shape.

The upturn 25 of the carcass reinforcement 22 forms a complete loop which begins at the point A1 obtained as the intersection of the carcass reinforcement with a line D perpendicular to the tire's rotation axis and passing through a radially innermost point A of the bead wire 23. The other end of the carcass reinforcement upturn is marked by the point F in FIG. 2, this point F being located in the portion radially outside the bead wire 23. A supplementary bead reinforcement 26 is also provided, which is located axially outside the loop formed by the upturn 25 of the carcass (i.e. on the side of the part of the bead intended to come in contact with the hook Jc of the mounting rim).

A variant, not shown, consists in extending the supplementary reinforcement 26 axially inwards so as to be wedged radially between the bead wire 23 and the mounting rim seat Js.

The bead structures according to the invention show some advantage compared with the prior art relating to the case of carcass reinforcements whose reinforcing elements are metallic (in the form of cords). In effect, in such cases application of the technical principle of the invention makes it possible to avoid having to carry out a permanent deformation of the reinforcing elements (plastic deformation of the metallic elements that compose the cords) before or during fabrication. Of course, such plastic deformation can also be carried out according to need, for example after having made the loop.

Figure 3:
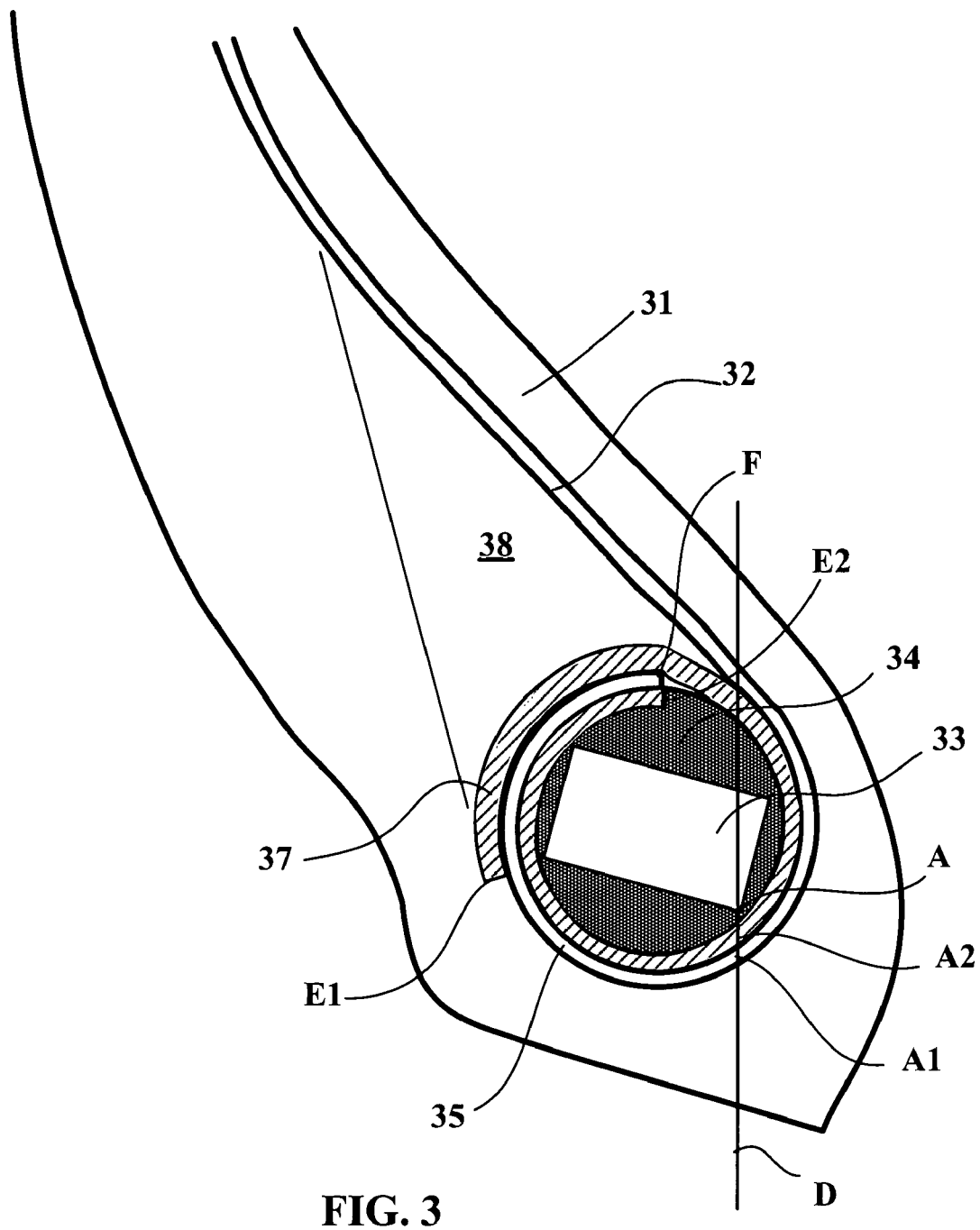
FIG. 3 shows another bead variant, which corresponds to that of FIG. 2 but in which the carcass reinforcement is lengthened by an extension.

FIG. 3 shows another variant of a bead 31 according to the invention, which corresponds to the bead in FIG. 2 except in that the upturn 35 of the carcass reinforcement is extended by an extension 37 to form a complete loop between a point A1 (intersection of a line D perpendicular to the rotation axis and passing through the axially innermost point A of the bead wire 33) and a point F at the end of the extension.

The carcass reinforcement 32 is anchored around a bead wire 33 clad in a profiled element 34 of rubber mix; this carcass reinforcement has an upturn 35 which begins at the point A and extends as far as the point F to surround the profiled element 34 only in part; the upturn 35 is lengthened by an extension 37 coupled to the carcass reinforcement between a point E1 and the end point F of the upturn 35 over a length equal to about half the length of said upturn. The extension 37 lengthening the upturn 35 then passes through a point A2 between the point A and the point A1, and ends at a point E2 radially outside the bead wire 33.

This structure is particularly advantageous when the cords of the carcass reinforcement have flexural rigidity characteristics which make it difficult to form a complete loop around a bead wire and keep it in place. The coupling reinforcement forming the extension is chosen, inter alia, to have properties that make it easier to curve and so to form a loop. This bead structure variant illustrated in FIG. 3 can comprise one (as in the case shown) or more coupling reinforcements, located on the same side of the upturn or on either side thereof. In another variant, at least one extension is lengthened until it is coupled with the whole of the upturn, or even extended on the inner side of the bead along the carcass reinforcement.

The invention is not limited to the examples described and illustrated, and can be modified in various ways without going beyond its scope. In particular, at least one plastic deformation can be carried out on the upturn of a carcass reinforcement with metallic reinforcing elements (said plastic deformation being carried out, for example, before the fabrication of the tire).

Moreover, the wrapping direction of the carcass reinforcement upturn, shown in the variants described as running from the inside of the tire outwards, can be inverted (from the outside inwards).

Figure 4A:
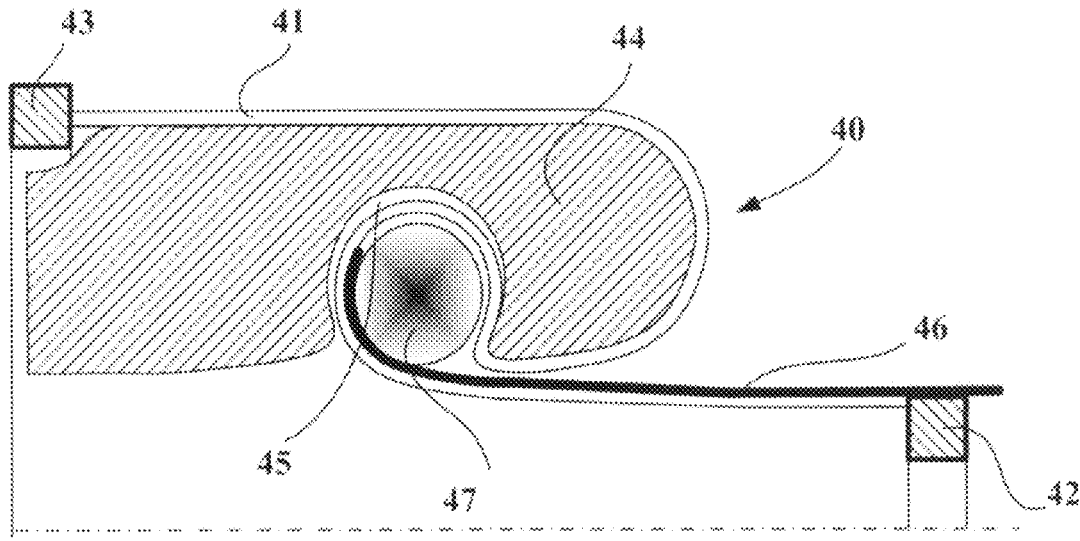
FIGS. 4A and 4B show a device suitable for producing a bead according to the invention.
Figure 4B:
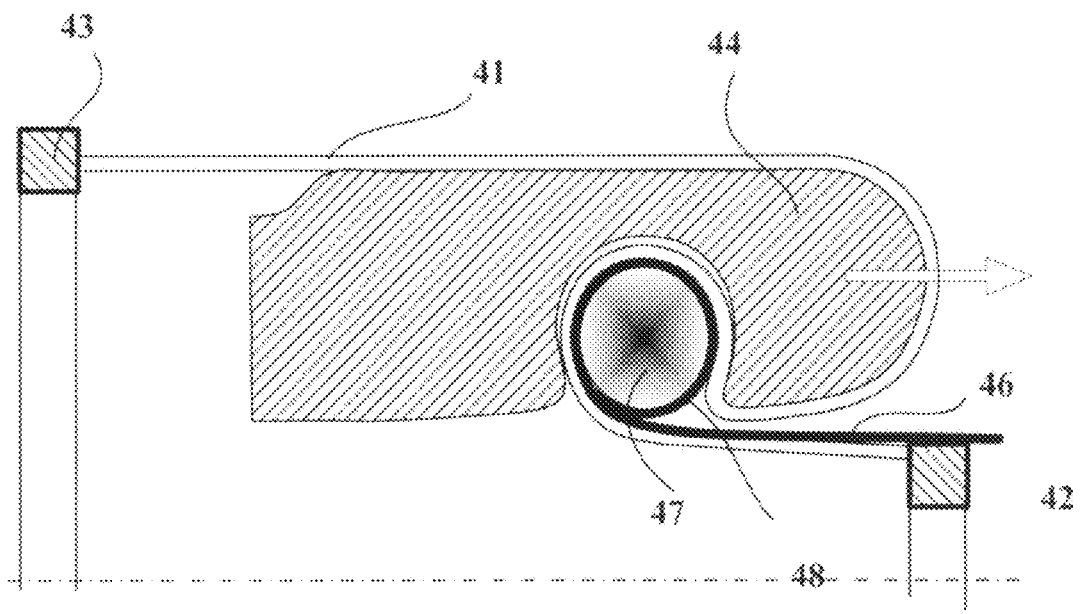

To make tires with beads according to the invention, a wrapping device 40 such as that represented in meridian section in FIGS. 4A and 4B is used. This wrapping device 40 that enables the carcass reinforcement upturn to be wrapped around a circumferential reinforcement (bead wire) comprises in particular a wrapping sheet 41 of essentially cylindrical shape with two axial ends fixed respectively to two rings 42 and 43 of different diameters (in the case shown, the diameter of the ring 42 located axially on the inside is smaller than the diameter of the ring 43). The rings 42 and 43 are themselves fixed to drive mechanisms in the axial direction (not shown).

The device 40 also comprises a head 44 positioned axially between the rings 42 and 43, and this head can be moved axially relative to said rings.

In addition, the head 44 has an outer surface comprising, radially on the inside, a concave cavity 45 designed to surround, at least in part, one end of the carcass reinforcement 46 to be turned up around a bead wire 47.

In the wrapping configuration the sheet 41 co-operates with the head 44, by sliding over the outer surface of said head to draw the end of the carcass reinforcement 46 around the bead wire 47.

To wrap the end of the carcass reinforcement 46 around the bead wire 47, said bead wire is positioned concentrically with the carcass reinforcement which has itself previously been placed on a cylindrical building drum; the device 40 is then positioned so that the axially innermost ring 42 is located radially and axially inside the bead wire and so that the bead wire and the end of the carcass reinforcement are in the cavity 45 (this stage corresponds to FIG. 4A). The head 44 is then moved axially inwards (along the direction indicated by the arrow A in FIG. 4B) to bring about a relative sliding of the sheet 41 over the outer surface of the head 44 and thus to enable the end of the carcass to be drawn so as to form a loop 48 around the bead wire.

Thanks to this device it is of course possible to adjust the number of wrapping turns (i.e. loops) of the carcass reinforcement around the bead wire by determining in advance the axial displacement of the head of the device.

What is claimed is:

1. A tire with two beads configured for mounting in seats of a mounting rim (J), the tire comprising a radial carcass reinforcement anchored in each of the beads by a radial upturn,
   wherein each radial upturn, when viewed in a meridian section, extends from a point of origin (A1) that corresponds to an intersection of the radial carcass reinforcement and a line (D), the line (D) extending perpendicular to a rotation axis of the tire and passing through a radially innermost point (A) of a respective circumferential bead reinforcement, and
   wherein, when viewed in a meridian section, the radial upturn extends continuously from the point of origin to form at least one anchoring loop around the circumferential bead reinforcement and an end of the radial upturn is located between another portion of said radial upturn of the carcass reinforcement and the circumferential bead reinforcement; and
   wherein cords of the radial upturn and the carcass reinforcement are disposed within a same plane which extends perpendicularly to the rotation axis of the tire.

2. The tire according to claim 1 wherein the circumferential bead reinforcement comprises a bead wire, said bead wire being clad in a profiled element formed of at least one rubber mix, and wherein the at least one anchoring loop surrounds both the bead wire and said cladding.

3. The tire according to claim 1 wherein the radial carcass reinforcement comprises reinforcing elements made of metallic cords.

4. The tire according to claim 1 wherein at least one of the two beads comprises a supplementary reinforcement whose reinforcing elements define an angle smaller than 45° with a circumferential direction of the tire, said supplementary reinforcement being located axially outside the radial upturn of the radial carcass reinforcement.

5. The tire according to claim 1 wherein the radial upturn around the circumferential bead reinforcement runs from an inside towards an outside of the tire.

6. The tire according to claim 1 wherein the radial upturn of the radial carcass reinforcement comprises at least one plastic deformation.

7. The tire according to claim 1 wherein the another portion of the radial upturn of the carcass reinforcement and the circumferential bead reinforcement is located radially outside of the circumferential bead reinforcement.

8. A tire with two beads configured for mounting in seats of a mounting rim (J), the tire comprising a radial carcass reinforcement anchored in each of the beads by a radial upturn,
   wherein each radial upturn, when viewed in a meridian section, extends from a point of origin (A1) that corresponds to an intersection of the radial carcass reinforcement and a line (D), the line (D) extending perpendicular to a rotation axis of the tire and passing through a radially innermost point (A) of a respective circumferential bead reinforcement, the radial carcass reinforcement includes a first portion forming the radial upturn, which is lengthened by a second portion coupled to the first portion, and
   wherein, when viewed in a meridian section, the each radial upturn extends from the point of origin to form at least a portion of at least one anchoring loop around the circumferential bead reinforcement, the at least one anchoring loop being completed by the second portion, where the second portion includes a first end located between an end of the radial upturn of the radial carcass reinforcement and the circumferential bead reinforcement and a second end arranged radially outside of the radial upturn, the second portion having properties that facilitate curving of the second portion to form the at least one anchoring loop.

9. The tire according to claim 8 wherein the circumferential bead reinforcement comprises a bead wire, said bead wire being clad in a profiled element formed of at least one rubber mix, and wherein the at least one anchoring loop surrounds both the bead wire and said cladding.

10. The tire according to claim 8 wherein the radial carcass reinforcement comprises reinforcing elements made of metallic cords.

11. The tire according to claim 8 wherein at least one of the two beads comprises a supplementary reinforcement whose reinforcing elements define an angle smaller than 45° with a circumferential direction of the tire, said supplementary reinforcement being located axially outside the radial upturn of the radial carcass reinforcement.

12. The tire according to claim 8 wherein the radial upturn around the circumferential bead reinforcement runs from an inside towards an outside of the tire.

13. The tire according to claim 8 wherein the radial upturn of the radial carcass reinforcement comprises at least one plastic deformation.

14. The tire according to claim 8 wherein the second portion is located radially outside of the circumferential bead reinforcement.

* * * * *